Sept. 26, 1939.                H. GASTROW                    2,174,319
                    MOLDING OF THERMOPLASTIC MATERIALS
                        Filed Dec. 16, 1936           2 Sheets-Sheet 1
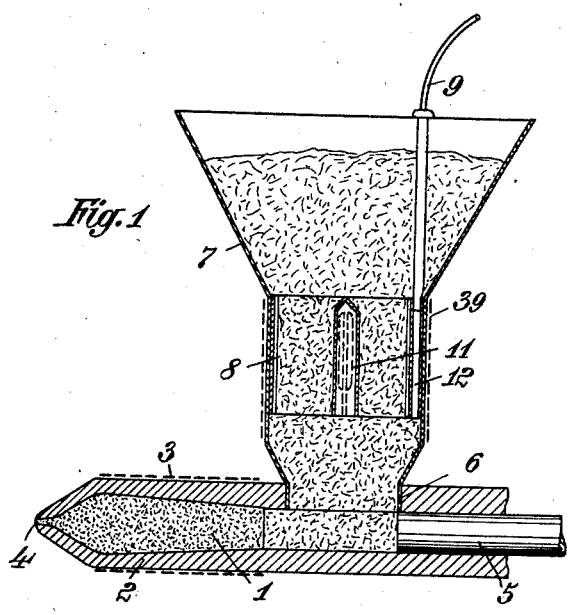
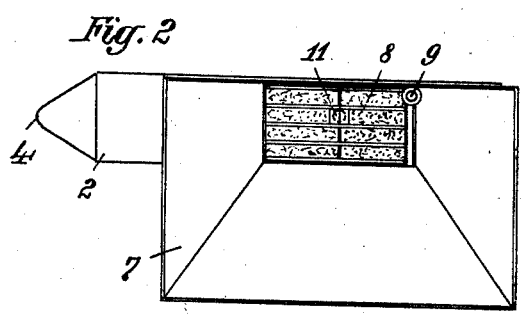
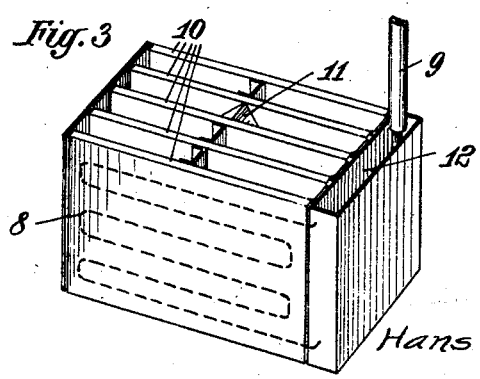
Inventor:
Hans Gastrow.
Harness, Dickey, Pierce & Hann
Attorneys.

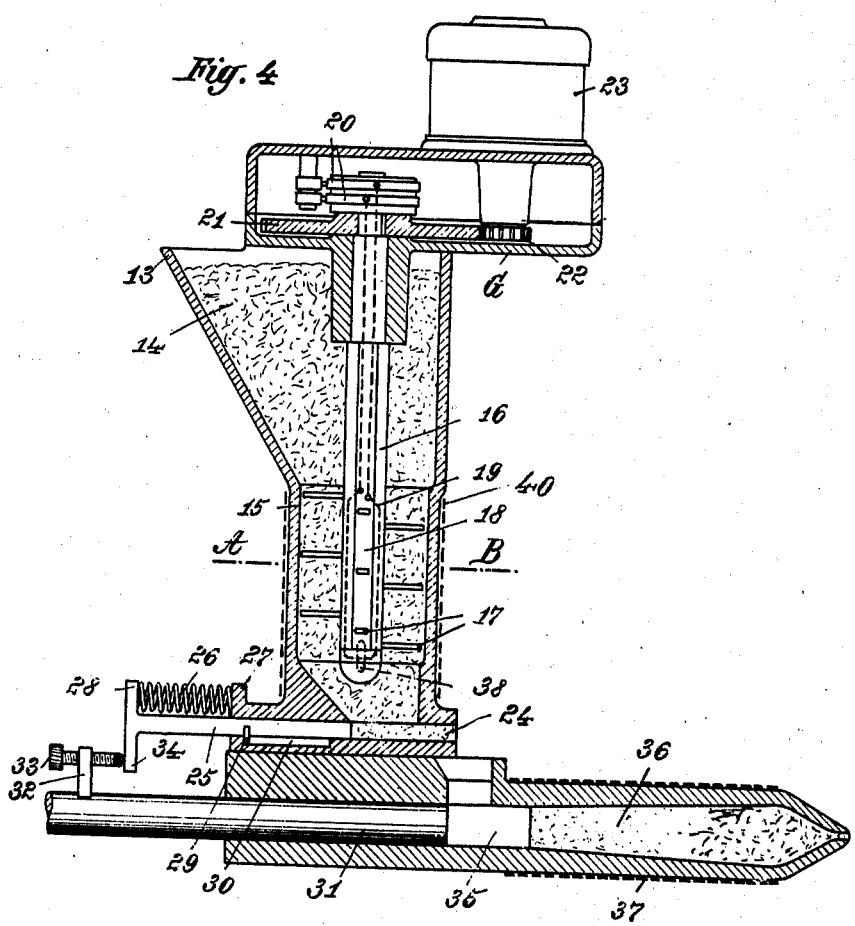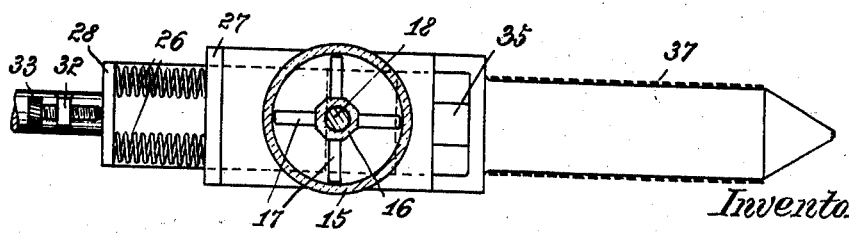

Patented Sept. 26, 1939

2,174,319

UNITED STATES PATENT OFFICE 2,174,319

MOLDING OF THERMOPLASTIC MATERIALS

Hans Gastrow, Zerbst in Anhalt, Germany, assignor to Franz Braun Aktiengesellschaft, Zerbst in Anhalt, Germany Application December 16, 1936, Serial No. 116,073 In Germany December 19, 1935

2 Claims. (Cl. 18—55)

The invention relates to a method and an arrangement for preheating thermoplastic materials before they are subjected to pressure for the purpose of injecting them into molds.

In order to be formed into molded articles the thermoplastic material is heated in a cylinder terminating in a nozzle and by means of a piston is subjected to a high pressure due to which that part of the material which is near the nozzle and which has become sufficiently fluid is injected into the mold. After the piston has maintained the pressure for a certain time in order to compensate for any losses arising due to leaks and for the reduction in volume occurring due to the contraction of the article in the mold, the piston is then withdrawn.

Thus during the injection operation the piston must move in the forward direction the material which is in the cylinder and which is still quite cold at the inlet end. The more or less cold material which is compressed under high pressure opposes a considerable frictional resistance to the forward movement and, to overcome this resistance it is necessary to employ many times the force requisite for the actual operation of filling the mold. In addition it has been found to be difficult to heat the material uniformly to the required temperature in the heating and pressure cylinder because on the one hand such thermoplastic materials have a small thermal conductivity and on the other hand they are readily damaged at high temperatures. Consequently it was frequently necessary to wait a considerable period before the injection operation in order to give the material time to heat up sufficiently so that the economy of operating such injection molding machines was considerably reduced.

According to the invention the above-mentioned disadvantages are avoided by preheating prior to its entry into the cylinder the loose material which is not under pressure.

Such thermoplastic materials are generally supplied commercially in granular form. In the cold state these granules are relatively large and sharp-edged and consequently oppose a large resistance to the forward movement in the pressing and heating cylinder. The frictional resistance of these granules is considerably reduced by the preheating as they have a certain plasticity at higher temperatures. The quantity of heat which has to be introduced into the material in the pressing and heating cylinder is reduced, so that the material can be completely heated to the injection temperature in the shortest possible time and with a minimum of difficulty. The invention thus increases the output of the molding machine and reduces the pressure required so that an improvement is obtained in two respects. Surprisingly it has been found that the ordinary commercial thermoplastic materials, such as polyvinyl compounds or cellulose acetate, can be preheated to a relatively high temperature without the individual granules having a tendency to stick together. Thus in the present invention it is possible to retain the modes of dosing the material which were hitherto customary, without risk of the individual granules sticking together.

It has for example been found that the ordinary thermoplastic masses can be preheated up to half the temperature necessary for the injection operation without any difficulties arising in the dosing and feeding of the material to the heating and pressing cylinder.

It has, however, been found that with increasing preheating temperature there is an increasing danger of the preheated granular material compacting so firmly under the pressure of the superimposed material that the material may not fall through automatically from the preheating device into the pressing cylinder although at the temperature employed the individual granules have not been converted into such a condition that they adhere together. To overcome this defect it is proposed according to the invention that during the preheating an auxiliary movement should be imparted to the material, preferably in a direction different from the general direction of movement.

The preheating can be effected by means of any source of heat, for example by gas or oil. It is however preferable to employ electric heating. As the material passes through the preheating device only under very small pressure, the entire heating surfaces of the heating device or at least a part thereof may be surrounded by the material on both sides without danger of the frictional resistance of the material passing through the heating device becoming too great. In this way an entirely uniform preheating of the thermoplastic material to the desired temperature can be obtained with simple means. The conduit or container through which the material to be preheated passes to the cylinder may also be heated from the outside, apart from the preheating device disposed within this conduit.

Preferably a regulating device responsive to temperature is provided which operates on the heat (energy) supplied to the preheating device in order to maintain a constant temperature. It is advisable to make the controlled temperature adjustable in order to be able to adapt it to the differing properties of the different thermoplastic materials. In this way it is possible to avoid with certainty any overheating or sticking of the thermoplastic material at the preheating surfaces.

The measure of imparting to the material during the preheating, an auxiliary movement which preferably is in a direction different from the general direction of movement of the material, can be performed in many ways. The simplest method is to employ an agitating mechanism within the supply hopper in which the preheating of the material occurs, to maintain in constant movement the entire contents of the hopper or at least that part of the material which, due to the heat, tends to agglomerate.

The surfaces, spokes or vanes of the agitating device are preferably arranged offset with respect to one another in the direction of general movement of the material so as to increase the path which has to be traversed by the individual granules thereof. The action of the auxiliary movement of the particles can also be improved by giving the vanes of the agitating device a slope such that the particles traverse a wave-shaped path.

The arrangement for effecting the preheating is advantageously such that the agitating mechanism itself as well as the boundary walls of the conduit in which the agitating mechanism is arranged are heated. In this way a particularly uniform preheating of the material is obtained. As due to the heating of the agitating mechanism the heated surfaces are constantly in motion with respect to the material which is to be heated, there is moreover an improved transfer of heat from the heating surfaces to the particles of the material.

Even when employing an agitating mechanism it is advisable to effect the preheating by electric heating or by separate heating bodies or by similar heating means. By suitable construction of the agitating mechanism and by increasing the speed of rotation thereof, it is however possible to produce by the resultant friction some or all of the heat necessary for preheating the material. In this case also it is advisable by suitable arrangement or construction of the surfaces, spokes or vanes of the agitating device to increase the path traversed by the particles of the material in performing the auxiliary movement.

Advantageously the dosing device serving to introduce the requisite quantity of the preheated material into the pressing cylinder is attached to the preheating device and/or the agitating mechanism.

Two arrangements for carrying out the invention are shown diagrammatically by way of example in the accompanying drawings. For the sake of simplicity no dosing device is shown in the first embodiment. In the drawings:

Figure 1 shows a longitudinal section through a pressing and heating cylinder together with the supply hopper and the preheating device.

Figure 2 is a view of these parts from above.

Figure 3 is a perspective view of the preheating device which, for example, is heated electrically.

Figure 4 is another embodiment in which an auxiliary movement is imparted to the preheated material by means of an electrically preheated agitating mechanism.

Figure 5 shows a plan view of the arrangement of Figure 4 in partial section along the line A—B.

In the embodiment according to Figures 1—3 the thermoplastic material 1 is heated in the pressing and heating cylinder 2 by means of the heating elements 3 and is forced through the nozzle 4 into the mold by means of the piston 5. At the inlet end of the heating and pressing cylinder 2 is a filling opening 6 on which the supply hopper 7 is mounted. Provided in the supply hopper is an electrically heatable preheating device 8 to which electric current is supplied through the cable 9. In addition the material is preheated from the outside by means of the electrically heatable device 39; the leads through which the current passes to and from the device 39 are not shown. The preheating device 8 disposed within the hopper 7 consists for example of a plurality of heating plates 10 in which the heating wires are embedded and which are surrounded by the material on both sides. Provided at some suitable point on the heating device 8 is a regulating device 11 which is reponsive to temperature and controls the current supplied to the preheating device so as to maintain a constant temperature. The space indicated at 12 serves to accommodate the means for connecting the heating bodies to the supply cable.

In the embodiment according to Figures 4 and 5, 13 is the supply hopper which serves for receiving the cold granular thermoplastic material 14. The supply hopper merges into a cylindrical portion 15 in which the agitating mechanism 16 is disposed. This mechanism consists of a hollow shaft 18 provided with spokes, surfaces or scoops 17 for agitating and imparting movement to the material. The shaft 18 is journalled in a housing G and extends freely downwardly therefrom. Internally it is provided with an electric heating device, the connecting leads 19 of which pass through the shaft up to the slip rings 20 through which the heating current is supplied to the heating body. In addition the material is heated from the outside by means of the device 40 which also is adapted to be heated electrically. The leads for carrying the current to and from the heating device 40 are not shown. Incorporated in the heating leads is a thermo-control device 38 which serves to keep the temperature of the preheated material constant.

Provided at the upper end of the shaft 18 within the housing G is a gear wheel 21 which is in engagement with a corresponding gear wheel 22 which is keyed to the end of the shaft of an electric motor 23.

The cylindrical portion 15 in which the actual agitating mechanism is disposed and in which the preheating occurs discharges into a space 24 in which a slide 25 is arranged to move to and fro. The dosing of the material is effected by means of this slide 25. The slide 25 is subjected to the action of a spring 26 which bears at one end against the housing 27 and at the other end against a shoulder 28 on the dosing slide. A pin 29 which moves in a corresponding recess 30 in the housing serves to guide the slide. Provided on the pressing plunger 31 is a projecting part 32 carrying an adjustable screw 33 which strikes against a projecting shoulder 34 on the dosing slide so that the latter is caused to participate in the forward stroke of the pressing plunger. The stroke of the dosing slide 25 can be adjusted directly by means of the screw 33.

35 is the pressure chamber of the cylinder in which the preheated material which drops into the cylinder is compacted and then conveyed into the heating chamber 36 in which it is transformed into the plastic condition by means of a heating device 37.

The spokes or agitating surfaces or vanes 17 are preferably so constructed and made of such material that they conduct the heat as rapidly as possible from the heating device of the agitating mechanism and transmit it to the material which is to be preheated.

I claim:

1. The method of molding thermoplastic materials such for example as cellulose acetate or polyvinyl compounds which comprises introducing the thermolastic material to be molded in granular form into a pre-heating chamber, preheating said material at a temperature lower than that required to produce fusion thereof, the while agitating the same and discharging said granular pre-heated material into a molding cylinder.

2. The method of molding thermoplastic materials which comprises introducing the material to be molded in granular form into a pre-heating chamber and heating and agitating said material at a temperature lower than that required to fuse the same, discharging said material into a molding cylinder, heating said material in said molding cylinder to plastic condition and discharging said plastic material therefrom.

HANS GASTROW